(12) United States Patent
Bigg et al.

(10) Patent No.: US 7,789,189 B2
(45) Date of Patent: Sep. 7, 2010

(54) TRANSMISSION MOUNT ASSEMBLY

(75) Inventors: Dave Bigg, Piqua, OH (US); Johann Vorster, Cape Town (ZA)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 193 days.

(21) Appl. No.: 12/185,421

(22) Filed: Aug. 4, 2008

(65) Prior Publication Data
US 2009/0095558 A1  Apr. 16, 2009

Related U.S. Application Data

(60) Provisional application No. 60/957,200, filed on Aug. 22, 2007.

(51) Int. Cl.
*B60K 17/00* (2006.01)
(52) U.S. Cl. .............................. 180/377; 280/124.109; 180/312
(58) Field of Classification Search ................ 180/292, 180/299, 300, 312, 377, 381; 280/781, 785, 280/124.109; 296/204, 205, 187.08
See application file for complete search history.

(56) References Cited

U.S. PATENT DOCUMENTS

| 1,406,316 | A | * | 2/1922 | Whitten ........................ 180/377 |
| 3,236,326 | A | * | 2/1966 | Reynolds ..................... 180/292 |
| 4,402,380 | A | * | 9/1983 | Strong ......................... 180/292 |
| 4,452,332 | A | * | 6/1984 | Ping et al. .................... 180/312 |
| 4,850,448 | A | * | 7/1989 | Stephens ...................... 180/299 |
| 5,174,541 | A | * | 12/1992 | Hutter et al. ................. 248/636 |
| 6,022,048 | A | * | 2/2000 | Harshbarger et al. ........ 280/781 |
| 6,561,574 | B1 | * | 5/2003 | Logan et al. ................. 296/204 |
| 6,733,021 | B1 | * | 5/2004 | Ziech et al. ........... 280/124.109 |
| 7,261,322 | B2 | * | 8/2007 | Ito et al. ...................... 280/781 |
| 7,575,088 | B2 | * | 8/2009 | Mir et al. ..................... 180/300 |
| 7,575,250 | B2 | * | 8/2009 | Werner et al. ............... 280/781 |

* cited by examiner

*Primary Examiner*—Faye M. Fleming
*Assistant Examiner*—Joseph Rocca
(74) *Attorney, Agent, or Firm*—Jeffrey P. Calfa; Mark C. Bach

(57) ABSTRACT

A mount assembly (74) for a transmission (78) on a vehicle having at least two frame members (16A, 16B) and a cross member (12) extending substantially between the frame members includes a mounting member (40) that is attached to the cross member. A cradle member (60) is coupled to the mounting member (40) and is configured for attachment to the transmission (78). The cradle member (60) suspends the transmission (78) from a top surface (83) of the transmission.

15 Claims, 3 Drawing Sheets

TRANSMISSION MOUNT ASSEMBLY

PRIORITY CLAIM

This application claims the benefit of U.S. Provisional Application Ser. No. 60/957,200, filed Aug. 22, 2007, under 35 U.S.C. §119.

FIELD OF THE INVENTION

The present invention relates generally to automotive mounting devices, and more particularly, to an improved automotive transmission mount.

BACKGROUND OF THE INVENTION

Typically, automotive transmissions are mounted on a cross-arm attached to the frame of the vehicle. A bottom surface of the transmission housing is attached to the mount, such as with extension studs or bolts. In this configuration, the bottom surface of the transmission is secured to and rests on the mount.

One drawback of the prior art transmission mounts is that there is limited space in which the transmission can be placed, and as a result, allowances have to be made in the floor of the cab to accommodate an upper portion of the transmission. That is, the floor of the cab is not truly flat, but is instead contoured convexly upward into the cab to provide space for the upper portion of the transmission. The end result is that space is taken away from the interior of the cab. Alternatively, if the transmission mount is lowered with respect to the frame of the vehicle to allow for a flat floor in the cab, the result is that the clearance between the ground and the mount is decreased, and the departure angle of the vehicle is minimized.

SUMMARY OF THE INVENTION

A mount assembly for a transmission on a vehicle having at least two frame members and a cross member extending substantially between the frame members includes a mounting member that is attached to the cross member. A cradle member is coupled to the mounting member and is configured for attachment to the transmission. The cradle member suspends the transmission from a top surface of the transmission.

DESCRIPTION OF A PREFERRED EMBODIMENT

Figure 1:
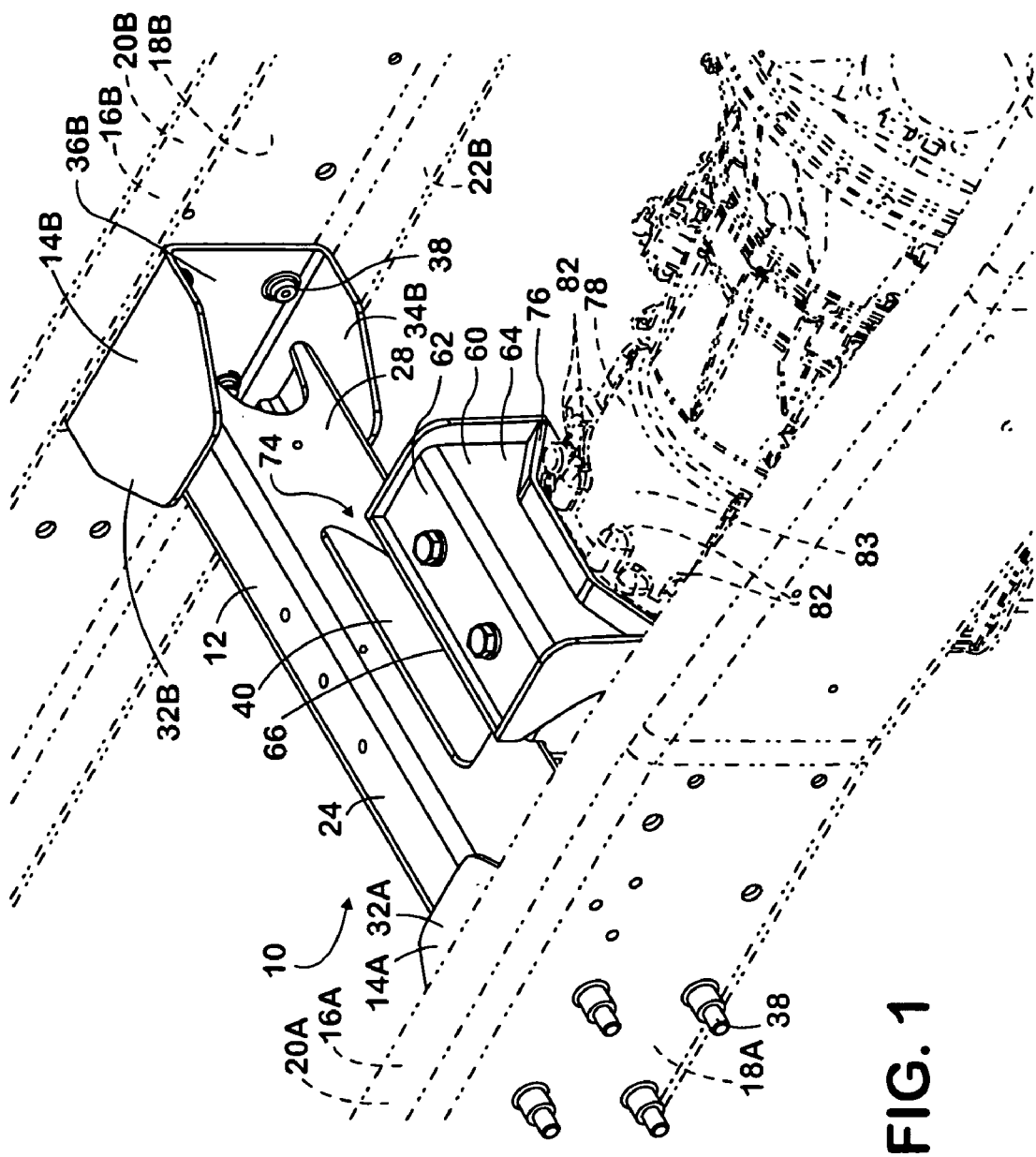
FIG. 1 is a top perspective view of a transmission mount in accordance with the invention.
Figure 2:
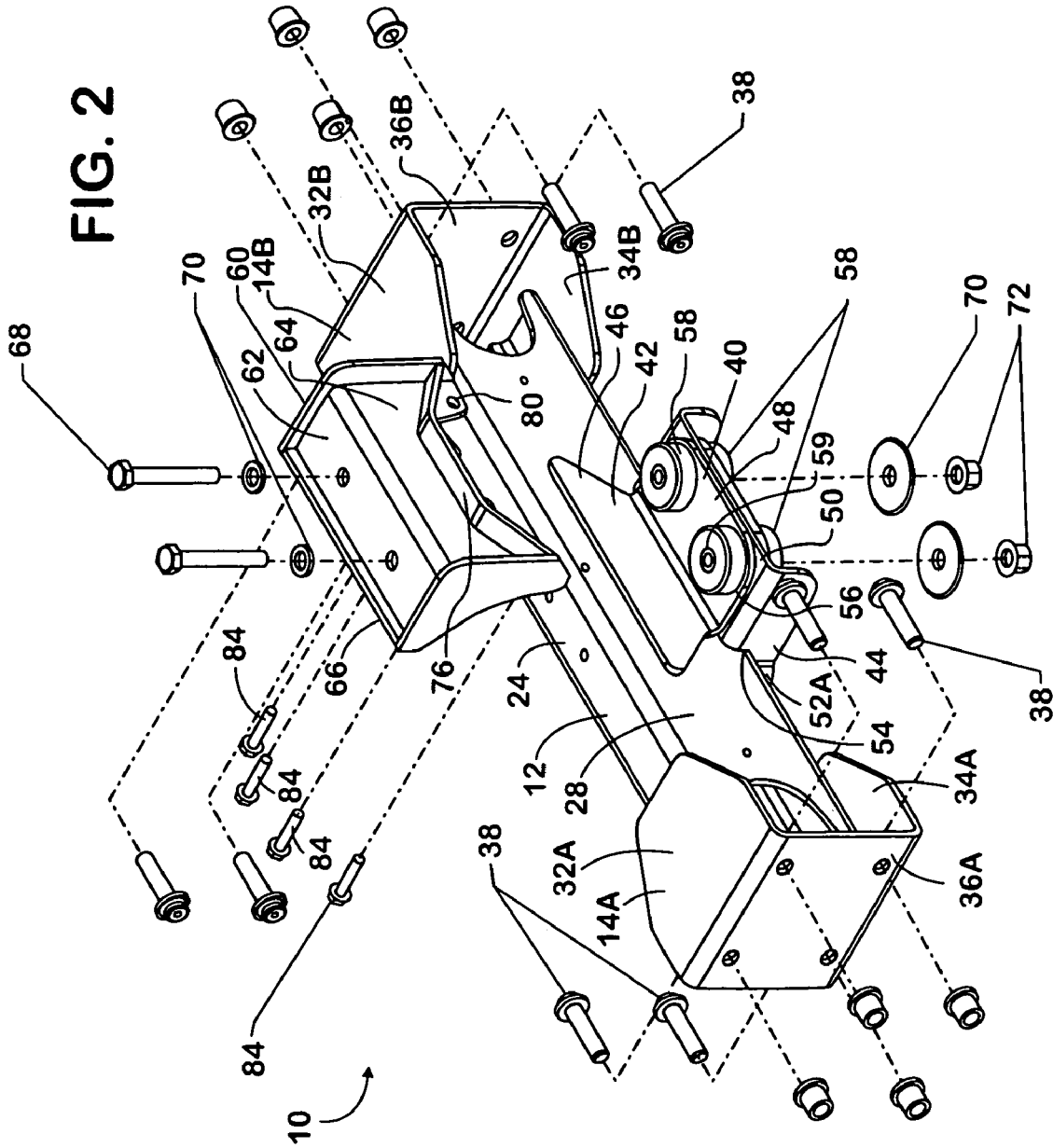
FIG. 2 is an exploded assembly view of the transmission mount in accordance with the invention.

Referring to FIG. 1 through FIG. 2, a transmission mount is indicated generally at 10 and includes a cross-member 12 and two end members 14A, 14B on each end of the cross-member. The end members 14A, 14B attach the transmission mount 10 to generally parallel frame members 16A, 16B of the vehicle (not shown). Advantageously, the frame members 16A, 16B are C-shaped channels having a web 18A, 18B, a first flange 20A, 20B, and a second flange 22A, 22B, although other structural members are contemplated.

The cross-member 12 is advantageously a lipped C-section that is disposed generally perpendicular to the frame members 16A, 16B, however other types of structural members are contemplated. In this configuration, the cross-member 12 has a top surface 24, a bottom surface 26 (see FIG. 3), and a first side surface 28 that are each joined together at about 90-degree angles. The cross-member 12 is advantageously formed of steel, however other materials are contemplated.

The end members 14A, 14B are generally U-shaped in cross-section and have a first flange 32A, 32B and a second flange 34A, 34B extending from a web 36A, 36B. The first flange 32A, 32B and the second flange 34A, 34B extend towards the center of the cross-member 12 in a generally parallel arrangement. Advantageously, the end members 14A, 14B nest inside of the frame members 16A, 16B, with the web 36A, 36B of the end members being fastened to the web 18A, 18B of the frame member 16A, 16B in a generally flush engagement, and the flanges 32A, 32B, 34A, 34B of the end member being disposed between the flanges 20A, 20B, 22A, 22B of the frame member. More specifically, the first flange 32A, 32B engages the top surface 24 of the cross-member 12, and the second flange 34A, 34B engages the bottom surface 26 of the cross-member.

Bolts, screws or any other type of fasteners 38 can be used to attach the end members 14A, 14B to the frame member 16A, 16B, or alternatively, the members can be welded, integrally formed, or attached by any other method. It is contemplated that the cross-member 12 can be directly attached to the end members 14A, 14B, or alternately, the cross-member 12 can be received within the end members 14A, 14B and prevented from rotation by virtue of the shape of the cross member and the end members.

In the transmission mount 10, the end members 14A, 14B are fastened to the frame members 16A, 16B with four spaced fasteners 38, however other ways of fastening the end members to the frame members are contemplated. Advantageously, the cross-member 12 extends substantially from web 36A to web 36B of the end members 14A, 14B, and substantially from web 18A to web 18B of the frame members 16A, 16B. Specifically, the cross-member 12 advantageously does not extend the entire distance from web 36A to web 36B of the end members 14A, 14B.

A mounting member 40 is mounted generally centrally on the cross-member 12 and includes a bracket portion 42 and a bracing portion 44 (best seen in FIG. 2). The bracket portion 42 includes a first section 46 that is welded to a lower portion of the first side surface 28 of the cross member 12. Alternately, it is contemplated that the first section 46 of the bracket portion 42 can be fastened or otherwise attached to the cross-member 12. A second section 48 of the bracket portion 42 is generally perpendicular to the first side surface 28 of the cross-member 12, and generally parallel to the top surface 24 and bottom surface 26 (see FIG. 3) of the cross-member. The first section 46 and the second section 48 are generally "L"-shaped in cross-section.

The bracing portion 44 of the mounting member 40 has a platform section 50 that is generally coextensive with and generally parallel to the second section 48 of the bracket portion 42. The bracing portion 44 also includes two legs 52A, 52B (see FIG. 3) that extend under the cross-member 12 and generally flush with the bottom surface 26 (see FIG. 3) of the cross-member.

Between the platform section 50 and each leg 52A, 52B is a shoulder 54 that abuts the first side 28 of the cross-member 12. The bracing portion 44 stabilizes the bracket portion 42 to secure the mounting member 40 on the cross-member 12. It is contemplated that the bracing portion 44 and the bracket portion 42 of the mounting member 40 are formed in one piece, or alternately, formed in multiple pieces.

Extending through the second section 48 of the bracket portion 42 and the platform section 50 of the bracing portion 44 are two holes 56, although other numbers of holes are contemplated. Isolators 58, advantageously made of rubber or similar resilient materials, are disposed in the two holes 56. Advantageously, the isolators 58 are generally cylindrical with a hole 59 in the center for receiving a fastener 68. It is contemplated that other resilient members having different sizes, shapes and configurations can be used as isolators 58.

A cradle member 60 has a first surface 62 that extends generally perpendicular from the first side surface 28 of the cross-member 12, and a second surface 64 that is generally perpendicular to the first surface 62 (best seen in FIG. 1). A first edge 66 of the first surface 62 is configured to flushly engage the first section 46 of the mounting member 40. The cradle member 60 is fastened to the mounting member 40 with two fasteners 68 that are fed through the first surface 62, through the isolators 58, through the holes 56 in the mounting member 40, and through washers 70 where they are received in nuts 72. In this configuration, the point of attachment between the cradle member 60 and the mounting member 40 is dampened by the isolators 58 to reduce the vibration between the members. The cradle member 60 and the mounting member 40 together form the mount assembly, indicated generally as 74.

The second surface 64 of the cradle member 60 has a cradle formation 76 that generally corresponds to the peripheral shape of a transmission 78 at the point of mounting. Advantageously, four generally equally spaced holes 80 are located generally along the length of the cradle formation 76 and align with four receiving formations 82, such as casting bolt holes on a top surface 83 of the transmission 78, however other numbers and spacing of holes are contemplated. The holes 80 in the cradle formation 76 receive fasteners 84 which are introduced through the cradle formation and into the transmission 78. When the fasteners 84 are received in the cradle formation 76 and the transmission 78, the transmission can be suspended from the cradle member 60. The cradle formation 76 evenly distributes the loads to the receiving formations 82 on transmission 78, and the transmission is suspended from the top surface 83 of the transmission.

Figure 3:
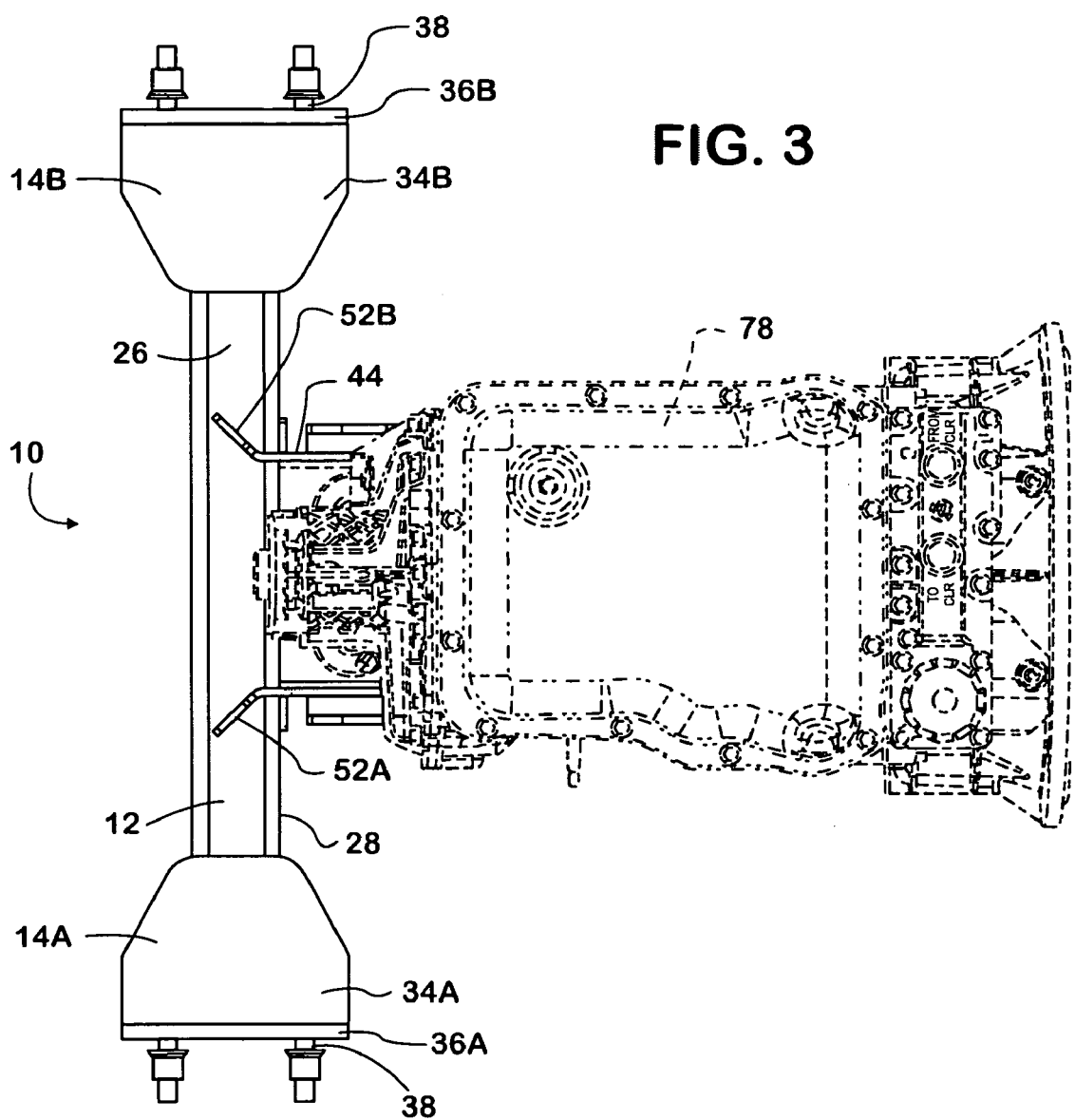
FIG. 3 is a bottom view of the transmission mount in accordance with the invention.

Referring now to FIG. 1 through FIG. 3, the transmission 78 is advantageously attached to cradle member 60 with four fasteners 82. The cradle member 60 is supported by the mounting member 40 through the isolators 58, and the cradle member 60 is attached to the isolators with the fastener assembly 68, 70, 72. While the fastener assembly includes bolts 68, washers 70, and nuts 72, other fasteners can be used.

Mounting member 40 is welded to the cross-member 12, and the cross-member acts as a structural support to transfer the loading of the transmission 78 to the frame members 16A, 16B. The cradle member 60 rests on the mounting member 40 such that, if the fasteners 68 were removed, the cradle member would remain supported by the isolators 58 and the mounting member 40, which is welded to cross-member 12. Very little lateral or foward/aft movement is possible between the cradle member 60 and the mounting member 40 because to shift the cradle member laterally or fowardly/aft, the entire transmission/engine 78 has to move, and the transmission is constrained in other locations, such as at rear engine mounts (not shown). The connection between the mounting member 40 and the cradle member 60 provides substantially only vertical support with minimal lateral constraint.

The mount assembly 74 allows a compact assembly of the transmission 78 in the frame members 16A, 16B, and allows the transmission to be mounted low in the frame members with little to no decrease in the departure angle. Further, the mount assembly 74 allows the transmission 78 to be mounted in the frame members 16a, 16B without the transmission protruding from the top surface 20A, 20B of the frame members, facilitating a flat floor in the cab.

The present mount assembly may be embodied in other specific forms without departing from its spirit or essential characteristics. The described embodiments are to be considered in all respects only as illustrative and not restrictive. All changes that come within the meaning and range of equivalency of the claims are to be embraced within their scope.

What is claimed is:

1. A mount assembly for a transmission on a vehicle having at least two frame members and a cross member extending substantially between the two frame members comprises:
   a mounting member attached to the cross member; and
   a cradle member coupled to the mounting member and configured for attachment to the transmission, wherein said cradle member suspends the transmission from a top surface of the transmission, wherein said mounting member is attached to a side surface of the cross member, and wherein said mounting member further comprises:
   a bracket portion having a first section that is attached to the side surface of the cross member, and a second section that is generally perpendicular to said side surface; and
   a bracing portion having a platform section that is generally parallel to said second section of said bracket portion, and at least one leg that extends from said platform section under a bottom surface of the cross-member.

2. The mount assembly of claim 1 wherein said cradle member further comprises a first surface that extends generally perpendicular from said side surface of the cross-member, and a second surface that is generally perpendicular to said first surface.

3. The mount assembly of claim 2 wherein said cradle member further comprises a first edge of said first surface that engages said mounting member.

4. The mount assembly of claim 1 wherein said cradle member further comprises a cradle formation generally corresponding in shape to a top surface of the transmission.

5. The mount assembly of claim 4 wherein said cradle formation further comprises a plurality of holes that are configured to align with a plurality of receiving formations on the top surface of the transmission.

6. The mount assembly of claim 5 wherein said plurality of holes in said cradle formation receive fasteners that are introduced through the cradle formation and are received by the transmission.

7. The mount assembly of claim 1 wherein said mounting member has at least one hole that is aligned with at least one hole of said cradle member for receiving at least one isolator.

8. The mount assembly of claim 7 wherein said at least one isolator has a hole for receiving a fastener that is inserted through said mounting member and through said cradle member.

9. A mount assembly for a transmission on a vehicle having at least two frame members and a cross member extending substantially between the two frame members comprises:
   a cradle member coupled to the cross member and having a cradle formation generally corresponding in shape to a top surface of the transmission, said cradle formation having at least one hole for receiving a fastener;
   wherein said cradle member suspends the transmission from a top surface of the transmission, wherein said cradle formation is coupled to said mounting member, wherein an isolator is disposed between said mounting member and said cradle formation, and wherein said mounting member further comprises:

a bracket portion having a first section that is attached to a side surface of the cross member and a second section that is generally perpendicular to said side surface; and a bracing portion having a platform section that is generally parallel to said second section of said bracket portion, and at least one leg that extends from said platform section under a bottom surface of the cross-member.

10. The mount assembly of claim 9 wherein said cradle member further comprises a first surface that extends generally perpendicular from a side surface of the cross-member, and a second surface that is generally perpendicular to said first surface.

11. The mount assembly of claim 10 wherein said cradle formation is disposed on said second surface of said cradle member.

12. A mount assembly for a transmission on a vehicle having at least two frame members and a cross member extending substantially between the frame members comprises:

a mounting member attached to the cross member, wherein said mounting member comprises:

a bracket portion having a first section that is attached to said side surface of the cross member, and a second section that is generally perpendicular to said side surface; and a bracing portion having a platform section that is generally parallel to said second section of said bracket portion, two legs extending from said platform section under a bottom surface of the cross-member, and a shoulder portion that abuts the side surface of the cross-member;

a cradle member coupled to the cross member and having a cradle formation generally corresponding in shape to a top surface of the transmission, said cradle formation having at least one hole for receiving a fastener; and an isolator disposed between said mounting member and said cradle member.

13. The mount assembly of claim 12 wherein said isolator has a hole for receiving a fastener that is inserted through said mounting member and through said cradle member.

14. The mount assembly of claim 12 wherein said cradle member further comprises a first surface that extends generally perpendicular from the side surface of the cross-member, and a second surface that is generally perpendicular to said first surface.

15. The mount assembly of claim 12 wherein said second section of said bracket portion and said platform section are generally coextensive.

* * * * *